United States Patent [19]

Moelands et al.

[11] Patent Number: 4,689,740
[45] Date of Patent: Aug. 25, 1987

[54] TWO-WIRE BUS-SYSTEM COMPRISING A CLOCK WIRE AND A DATA WIRE FOR INTERCONNECTING A NUMBER OF STATIONS

[75] Inventors: Adrianus P. M. M. Moelands; Herman Schutte, both of Eindhoven, Netherlands

[73] Assignee: U.S. Philips Corporation, New York, N.Y.

[21] Appl. No.: 317,693

[22] Filed: Nov. 2, 1981

[51] Int. Cl.⁴ ............................................. G06F 13/42
[52] U.S. Cl. ..................................... 364/200; 364/900
[58] Field of Search ................. 364/200, 900; 375/36, 375/95, 117, 106; 340/825.50, 825.51; 370/48, 85, 89

[56] References Cited

U.S. PATENT DOCUMENTS

| | | | |
|---|---|---|---|
| 3,597,549 | 7/1971 | Farmer | 179/15 |
| 3,632,881 | 1/1972 | Graham et al. | 179/15 |
| 3,639,694 | 2/1972 | Deutsch | 364/200 |
| 3,680,056 | 6/1972 | Kropfl | 340/172.5 |
| 3,720,790 | 3/1973 | Watson et al. | 179/15 |
| 3,793,488 | 2/1974 | King et al. | 179/15 |
| 3,889,236 | 6/1975 | Herger et al. | 340/172.5 |
| 3,922,486 | 11/1975 | DeJean | 178/68 |
| 4,101,732 | 7/1978 | Suzuki | 370/48 |
| 4,168,469 | 9/1979 | Parilch et al. | 325/38 |

Primary Examiner—Gareth D. Shaw
Assistant Examiner—Christina M. Eakman
Attorney, Agent, or Firm—Jack E. Haken

[57] ABSTRACT

A computer system comprises a number of stations which are interconnected by means of a clock bus wire (20) and a data bus wire (22) which both form a wired logic function of the signals generated thereon by the stations (32, 34). During the clock pulses, the signal on the data bus wire is stationary; it may change between the clock pulses. Start and stop conditions are formed by a signal combination between clock bus wire and data bus wire (60 and 62, respectively) which is not permissible in a data stream. If there is more than one master station so that a composite clock signal occurs on the clock bus wire, the clocks of the relevant master stations are each time resynchronized to the actual transitions in the composite clock signal.

35 Claims, 7 Drawing Figures

TWO-WIRE BUS-SYSTEM COMPRISING A CLOCK WIRE AND A DATA WIRE FOR INTERCONNECTING A NUMBER OF STATIONS

BACKGROUND OF THE INVENTION

The invention relates to a computer system, comprising a first number of stations which are interconnected by a two-wire line which includes a data wire for transporting a series of data bits, and a clock wire which transports a synchronizing clock signal in parallel with each data bit between at least one transmitting station and at least one receiving station. The stations may be of different types: they may be microcomputers with a data processing function, but they also may be also input/output processors, function generators, memories, input/output equipment such as keyboards or displays, or sensors for physical and/or chemical quantities. A system of the described kind is known from U.S. Pat. No. 3,889,236. The known system provides the data transport in only one direction via the two-wire line.

SUMMARY OF THE INVENTION

A station which generates a message is a transmitting station. A station which absorbs a message is a receiving station. A station which controls the transport of a message is a master station. A station which is exclusively controlled by one or more stations during the transport of a message is a slave station. Any station which is suitable to act as a master (this is not necessary for all stations, for example, sensors may act only as slave stations) can initiate a data transport, starting from a rest condition. While there is a given distribution of the functions of master and slave stations, the functions of a transmitting/receiving station may change, for example, a first message from a master station may be answered by a second message from a slave station.

It is an object of the invention to enable a single two-wire line to be used for the interconnection of an unlimited number of stations. Reliable synchronization is obtained and simple signalling of the beginning and the end of a communication operation is possible. The stations are interconnected by a clock bus and a data bus. Each of the buses operates to form a wired logic function between the stations. Thus, each of the buses includes means (for example a pull-up resistor) which urges the bus toward a second voltage state in the absence of a forcing input from one of the stations. Each of the master stations includes means for producing a periodic clock signal on the clock bus by allowing the bus to assume the second voltage level during periodic clock pulse intervals and by forcing the bus to a first voltage level at all other times during production of the clock signal; the stations further comprise means for transmitting binary data by forcing the voltage on the data bus to the first voltage level during an entire clock pulse interval to transmit a first data value and by allowing the voltage on the data bus to assume the second voltage level during an entire clock pulse interval to transmit a second data value. Master stations further comprise means for producing a start signal, which indicates that the station is prepared to control data transmission, by forcing a transition of the voltage level on the data bus from the second voltage level to the first voltage level during a clock pulse interval and means for producing a stop signal which indicates that the station has finished controlling data transmission by forcing the voltage level on the data bus to the first voltage level during a first fraction of a clock pulse interval and then allowing the voltage on the data bus to transition to the second voltage level during the clock pulse interval. Thus, data transmission is indicated by signals on the data bus which remain constant through entire clock pulse intervals while control signals are indicated by transitions of the voltage level on the data bus which occur during clock pulse intervals.

In a system where two stations may transmit simultaneously, each master station comprises a time slot generator with an input for receiving a second start signal which is generated on the clock wire and means for supplying an end signal after termination of the time slot started thereby and is suitable for forming a modified signal for the clock wire under the control of said end signal. A detector for detecting a signal transition on the clock wire as an exclusive representation of said second start signal is also provided. All transmitting stations are synchronized by the transmitting station which first forms a signal transition to the first logic value on the clock wire and the transmitting station which last forms a signal transition to the second logic value on the clock wire. The data simultaneously appearing on the data wire can also be detected without interference between them. Each of the data bits appears in a defined time slot. A half "handshake" is thus formed. As a result, comparatively large differences between the time slots produced by the various time slot generators can be compensated. Such differences may be due to different internal clock frequencies of the otherwise identical time slot generators, but may also be due to the fact that the signal generators for the clock wires exhibit differences in the ratio between the durations of the first and the second logic signal value. It is to be noted that a station can detect the signal on the clock wire and/or data wire while it is transmitting, so that it can know whether or not its own signal is masked. The case where several stations simultaneously act as a transmitter occurs during an arbitration procedure (described below).

Preferably, a master station are suitable for starting a data transport operation by successively forming:
 a first start signal;
 a first series of at least two data bits having the first logic value;
 a second series of at least one data bit having the second logic value;
 a third start signal whose shape corresponds to the first start signal;

All stations also comprise an interrogation device whose "dead" time is shorter than the value corresponding to the length of said first series. In general there are two types of station: (1) stations which are continuously on stand-by, for example, a memory which may be activated at an arbitrary instant; and (2) stations in which given processing procedures take place or which do not have to be continuously active for other reasons. In the prior art, the latter stations had to interrogate the bus twice during each clock pulse period. However, in the above-described configuration, each such station need only interrogate the bus one time during each clock pulse period. As a result, the efficiency of the internal processing may be increased.

"Dead time" of a connected station is to be understood to mean the longest period of time occurring between two successive interrogation instants. Thus, for a station comprising an interrupt mechanism, the length of the dead time equals zero. When an element of the first series is detected, a station having a comparatively long dead time can change over to an increased interrogation frequency.

DESCRIPTION OF AN EMBODIMENT

Figure 1:
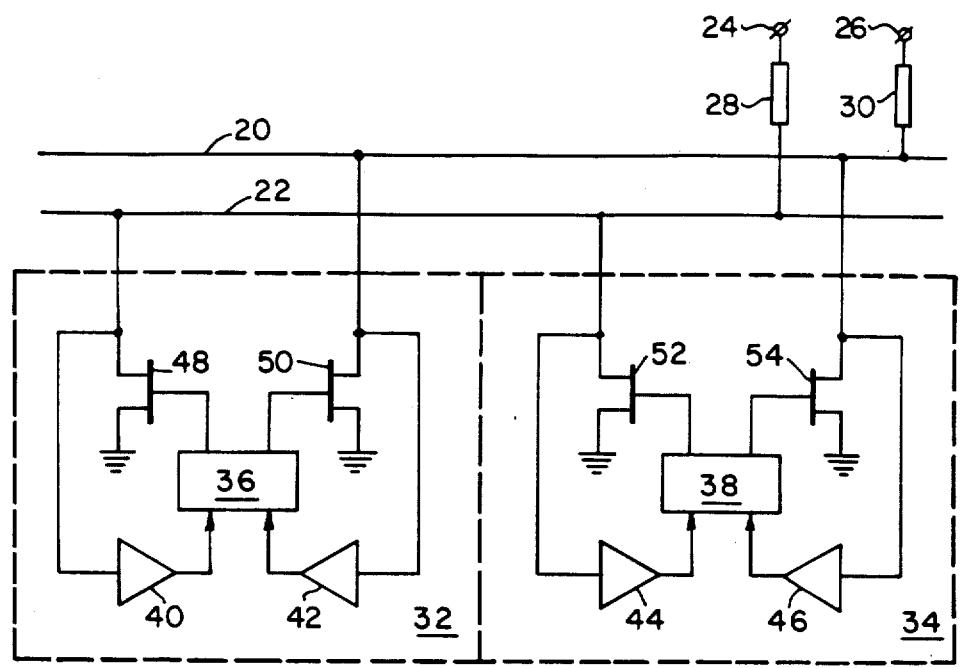
FIG. 1 shows the interconnection of two stations.

FIG. 1 shows diagrammatically the connection of two stations to a clock wire 20 and a data wire 22. Two stations 32, 34 each comprise two signal receivers 40, 42, 44, 46 for example amplifiers having a high input impedance. The stations furthermore comprise transistors 48, 50, 52, 54, for example MOS transistors. When one of these transistors becomes conductive, the relevant line (20, 22) assumes a low potential. Also present are resistors 28, 30. Terminals 24, 26 are to be connected to a high voltage VDD. If the transistors 48 and 52 are both cut off, the potential of the line 22 becomes substantially equal to VDD. The values of the resistors 28, 30 are large with respect to the resistances of the transistors in the conductive state, and small with respect to those of the signal receivers. When the potential VDD is taken as the "logic 1", each of the lines 20, 22 produces an AND function for the logic signal thereon. The stations 32, 34 also comprise units 36, 38 which notably form the data source and the data destination for the two-wire line. The output signals thereof control the conducting and blocking of the transistors 48, 50, 52, 54. (A station will be described in more detail with reference to FIG. 7.) It is to be noted that not all stations have to perform all functions. A station which exclusively performs a slave function need not comprise the means for generating a clock pulse train. A station which is used exclusively for receiving data need not comprise means for supplying data to the data wire.

Figure 2:
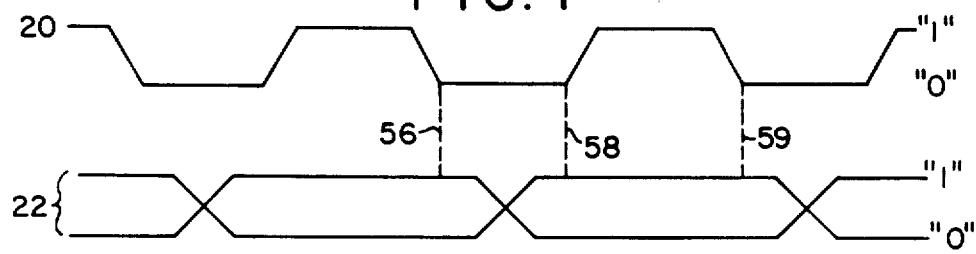
FIG. 2 shows the timing of the data transfer between two stations.

FIG. 2 shows a time diagram of the data transport between two stations. The clock signal is shown on the upper line. A sequence of data bits is shown on the lower line. During data transmission the data signal may only change between the instants denoted by lines 56 and 58 and must remain the same between the instants denoted by the lines 58 and 59 (i.e. the clock pulse interval including the time occupied by the edges of the clock signal). As noted below any change in the level of the data line which occurs during the clock pulse interval may be interpreted as a control signal.

The signals on the clock line 20 are formed by the station which acts as the "master" of the data transport. The non-master stations always produce logic "1" signals on the line 20. The signals on the clock line 20 are periodic.

The signals on the data line 22 are formed by a transmitting station. The two parallel lines indicate that the data content may be "0" or "1". Non-transmitting stations, continuously produce logic "1" signals on the data line 22.

The following possibilites exist:

(a) one master station transmits data to one or more receiving slave stations, (b) one master station receives data from one slave station. (Generally, this function is always preceded by an operation according to (a); for example: before a memory can be read, it has to be addressed.)

Some devices can only perform one or a few of functions: for example, a keyboard device may always serve as a master transmitter and a display device with LED elements may always act as a slave receiver. A magnetic or optical disk memory without a buffer will usually have to operate as a master when transmitting or receiving. Other devices such a microcomputers can perform all functions.

Figure 3:
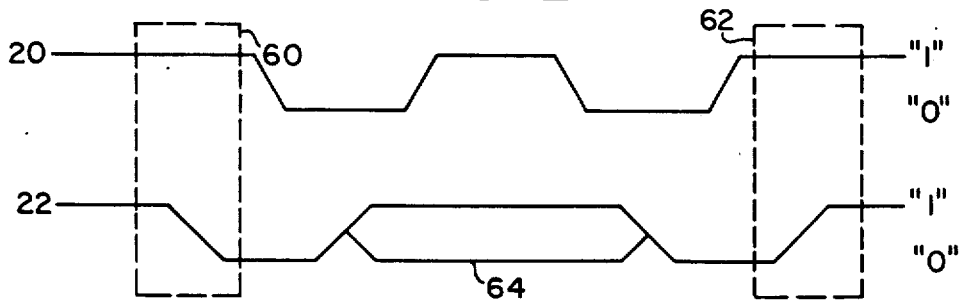
FIGS. 3 and 4 show the timing of the starting and stopping of a data transfer.

FIG. 3 shows a time diagram of the starting and stopping of the data transport between two stations. Initially, all stations generate "1" signals on the clock wire 20 and on the data wire 22. The transport is started by one of these stations which generates a transition on the data wire from "1" to "0", while the signal on the clock wire does not change; the relevant station thus manifests itself as a new master. This signal pattern is not permissible for data transport. All other stations thus recognize the pattern as a control signal and detect that a new master of the bus has asserted itself (block 60). Subsequently, the master produces a transition on the clock line, so that the first data bit can be generated on the data wire: this bit (64) may have the value "0" or "1". Data transport is always started with a transmission by the master station. This situation may prevail for the entire communication procedure. Alternately, the master station may designate another station as a slave and instruct this slave station to start a transmission operation. The original master station remains in control of the clock wire during transmission by the slave; this implies that the slave will transmit a message of known length.

For the termination of the data transport, transmission by slave, if any, it first terminated. The slave station then supplies a high signal to the data wire. The transmission procedure is then terminated by the master station which transmits a stop signal while the clock wire is at a "0" level. First the level on the data wire is also brought to "0". Subsequently, the level on the clock wire is brought to "1". Finally (block 62), the level on the data wire is brought to "1". This signal pattern also is not permissible in customary data transmission and is recognized as a control signal. The master thus releases the bus line, so that a next station can manifest itself as a master.

Alternately the following measures allow for dropping the requisite that the message length be pre-specified. After reception of each 8-bit data byte from the slave, the master generates a ninth clock pulse. During this ninth clock pulse interval the receiver may generate a conventional acknowledge signal by driving the data line to "0". Transmission between "slave-emitter" and "master-receiver" (e.g. between a memory and a microcomputer during a memory read out) will be terminated if the master does not produce the acknowledge signal. The slave then produces a high signal on the data line to enable the master to generate the "stop" sequence.

The master station only maintains the periodic nature of the clock signal between the start condition 60 and the stop condition 62. The start and stop conditions can be detected in a simple manner, if the stations comprise either an interrupt mechanism to detect and react directly to a signal transition or interrogate the potential of the data wire at least twice per clock pulse period to detect the transitions illustrated in blocks 60 and/or 62.

Figure 4:
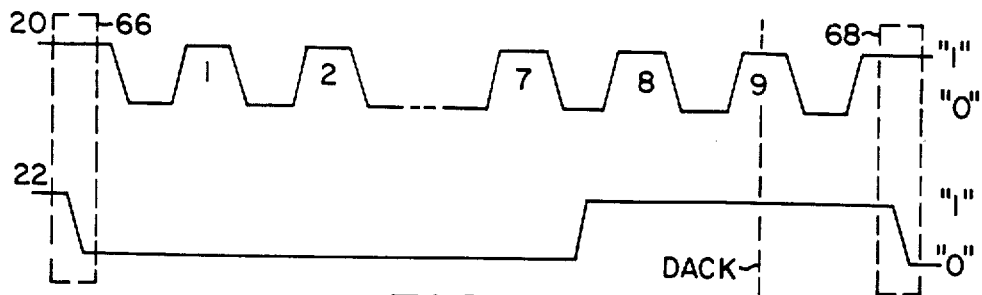

Alternately, FIG. 4 shows a second start procedure where a lower interrogation frequency of the data wire suffices. The first start condition in block 66 corresponds to that in block 60 of FIG. 2. Subsequently, the actual master of the bus line generates a serial 8-bit data byte having the value "0000 0001" (hexadecimal "01"). This means that the signal on the data line remains low for seven clock pulses (1, 2 . . . 7) and becomes high between the seventh and the eighth clock pulse. The start byte 0000 0001 must not be used for another communication purpose. The receiver stations do not supply an acknowledge signal in reaction to the reception of this code as they would normally do. The data signal then remains high and the ninth clock pulse acts as a dummy acknowledge signal DACK. The clock wire becomes high again and another start condition is generated in block 68. The combination of the start byte and the dummy acknowledge is chosen to be compatible wih the format of the data transport. Thus, the stations have approximately seven clock pulse periods for detecting the low signal on the data wire and the interrogation frequency of the data wire only has to be greater than approximately once per seven clock pulse periods instead of two per clock pulse period. In a microcomputer without interrupt mechanism, the internal activities can thus be performed better because they are held up less often by the interrogation operations. The interrogation mechanism of the relevant station is switched over to the higher interrogation speed (twice per clock pulse period) for correct detection of the second start condition (block 68) after the low signal on the data wire is detected.

For all cases where the first start condition also has an activating effect; the reception of the next start condition acts as a reset signal. For example in a continuously alert slave station which does not have an internal clock.

The described configuration of seven data bits "0" and two data bits "1" may also be different, for example 15×"0" and 2×"1" or 3×"0" and 2×"1". As the bus is in a "busy" state after the formation of the start condition in block 66, no new master stations can manifest themselves as such. The bus returns to the "free" condition after the formation of the stop condition, block 62 in FIG. 3.

Figure 5:
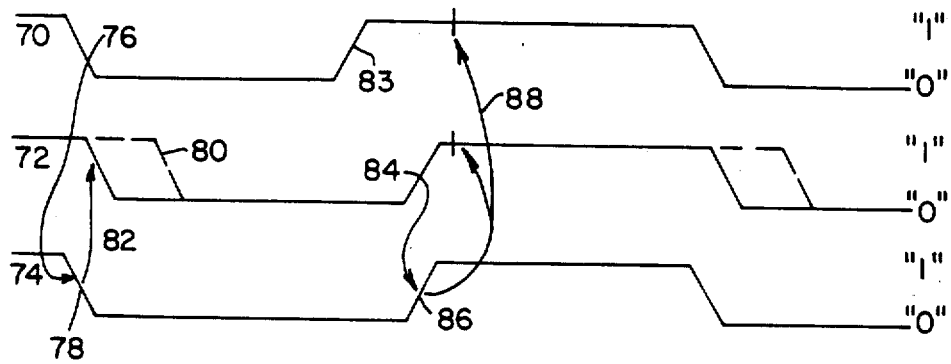
FIG. 5 shows the timing of a synchronization between several master stations.

FIG. 5 is a diagram which illustrates the synchronization of two master stations. Master stations will only attempt to seize control of the bus if they detect that it is in a "free" state. This state normallly occurs following the sequence illustrated in box 62 of FIG. 3. A station which seizes control of the bus will produce a start signal sequence in order to indicate to other competing stations that the bus is in use. The competing stations will not attempt to seize control of the bus after they have detected the start sequence. Arbitration is only necessary if two master stations attempt of seize control of the bus concurrently; that is if the second station attempts to seize the bus before it has detected and acted in response to the start signal issued by the first master station. Synchronization of the clocks in the two competing stations begins at the leading edge of the pulse in block 66 of FIG. 4. The actual arbitration procedure begins after the sequence of block 68 in FIG. 4.

In this example, it is assumed that two stations participate in the synchronization procedure. The first station drives the clock wire with a signal 70 (FIG. 5). The second station drives the clock wire with a corresponding signal 72. The signal produced on the clock wire if formed by ANDING the signals produced by the first and second stations. This is illustrated as signal 74. It is assumed that the first station has a clock frequency which is higher than that of the second station. Each station comprises a time slot generator, for example, a counter having a predetermined number of states. The carry output signal from the counter controls a transition of the output signal of the station. The signal sequence commences when the output of the first station transitions from high to low. This produces a signal transition 78, from high to low, on the clock wire. A subsequent transition from high to low by the second station (indicated by the interrupted line at 80) would then have no externally detectable effect. The second station includes a detector which detects the transition at 78 and which starts its time slot generator. At 83, the first station generates a transition from low to high, but this cannot be noticed on the clock wire; therefore, the time slot generator of the first station remains blocked for further counting. At 84, the second station also generates a signal transition from low to high and the signal on the clock wire also becomes high. The time slot generators in both stations are started to count down the next half clock pulse period in response to the clock wire signal transition. The lengths of the high parts of the composite clock signal on line 74 are thus determined by the fastest station. The lengths of the low parts of the clock signal are determined by the slowest station.

During the starting up of the synchronization, the roles are liable to be reversed if the transition at 82 occurs before that at 76. The starting and blocking of the time slot generators by the signal conditions on the clock wire then always take place in the same manner.

In given cases, the transition at 84 may be delayed further in the second station. In that case all time slot generators participating in the synchronization operation will assume the blocked condition. The presence of one (very) slow station together with one or more faster stations does not affect the signal transitions from the first logic value to the second logic value on the clock wire.

Figure 6:
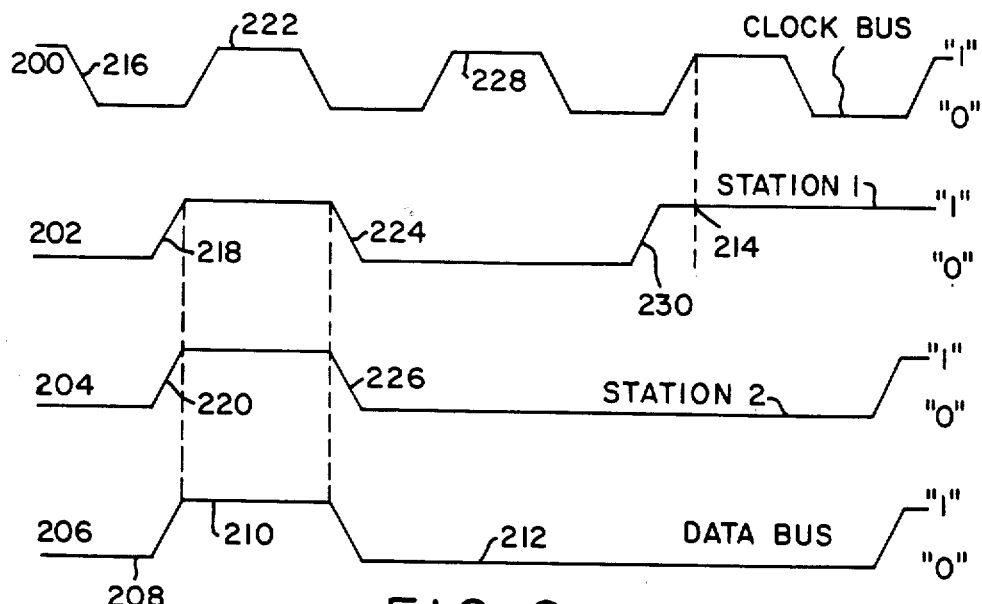
FIG. 6 shows the timing of an arbitration between several stations.

FIG. 6 shows a time diagram of an arbitration procedure between several stations which act as master transmitters. If several master stations manifest themselves simultaneously, a single master station has to be selected prior to the master-slave communication. This is realized by means of the arbitration procedure which commences directly after completion of the start sequence shown in FIG. 3 or FIG. 4. Each station has an address number, which is a 7-bit number. All address numbers differ. Line 200 shows the signal on the clock wire. Line 202 shows the signal which the first station produces on the data wire. Line 204 shows the signal which the second produces on the data wire. Line 206 shows the "AND" signal which in actually formed on the data wire. After the start sequence the data wire will be low (208). The first bits of the two address numbers are assumed to be "1", so that both stations produce a signal transition (218,220) and the data wire carries a high signal (210) during the next clock pulse period (222). The second bits of both address numbers are assumed to "0", so that subsequently both stations produce a signal transition again (224, 226) and the data wire carries a low signal (212) during the next clock pulse (228). In the third address bit, the address of the first station is a "1" and the address of the second station is a zero so that a signal transition occurs at 230 but it is masked in the signal 206. During the next clock pulse 214, the first station can determine that the signal on the data bus is different from the signal which it transmitted, thus it will know that it has lost the arbitration; the information is stored and acts to block the further supply of the relevant address number to the data wire. The other station is the winner in this case, but it only detects this after the entire address has been successively applied to the data wire. The winning station may subsequently start a communication operation with one or more slave stations.

In an alternate embodiment the master manifests itself by generating the address of its intended slave. Consequently, after generation of the slave address the identity of the master is not known to other stations, and a plurality of masters could be addressing the same slave station. Therefore the arbitrating procedure is continued during the ensuing data transport. If a plurality of master stations all transmit the same message to a single slave, none of them will lose the arbitration.

Figure 7:
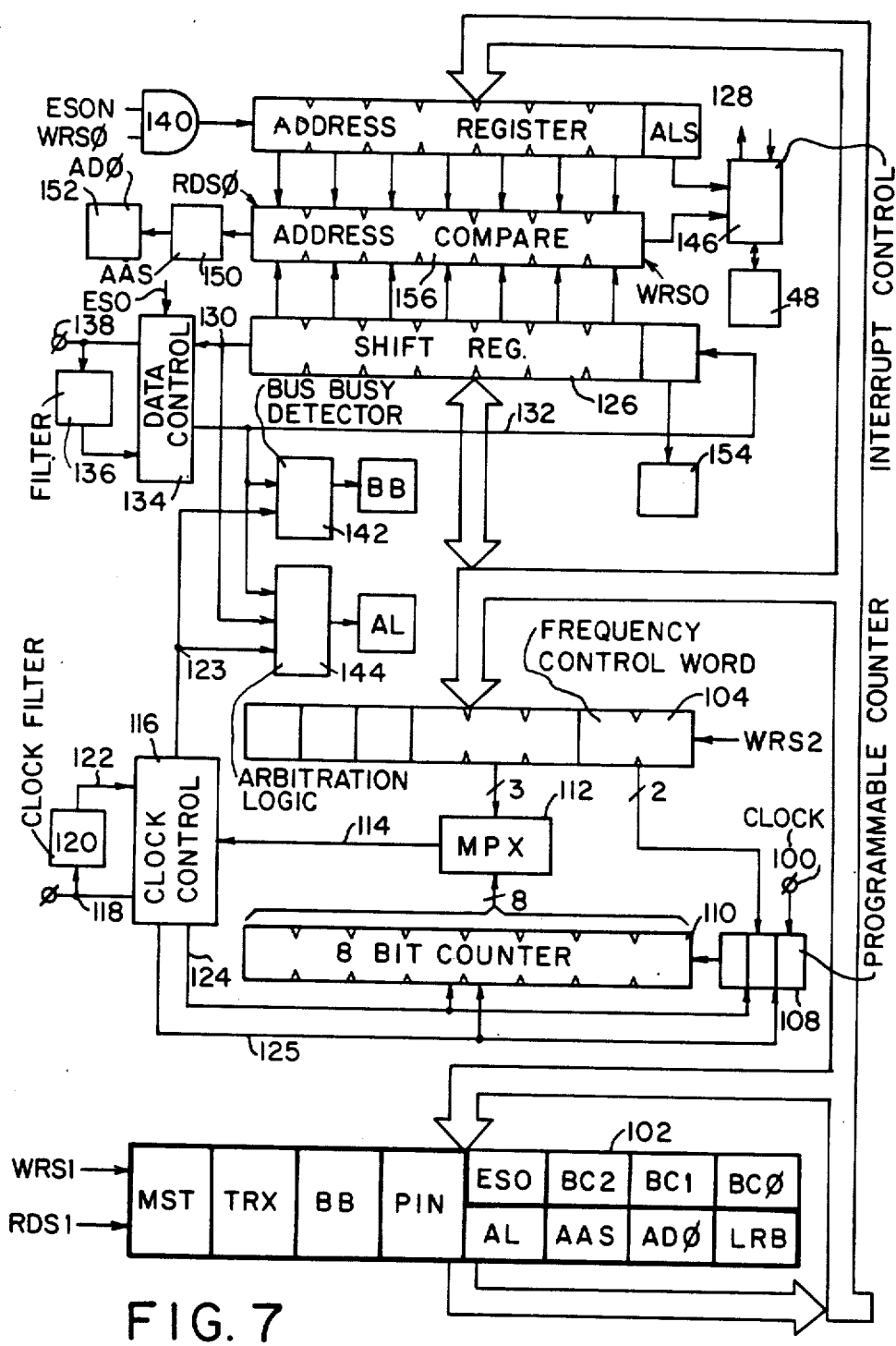
FIG. 7 is a block diagram of a station.

FIG. 7 shows a block diagram of a station at the register level in so far as it concerns the operation of the two-wire bus line. The assembly is suitable for incorporation in a microcomputer. The other parts of the microcomputer have been omitted for the sake of simplicity. The internal clock of the microcomputer is connected to input 100. Register 102 contains a status word. Register 104 contains a frequency control word. These registers are connected to an internal 8-bit data bus 106 of the microcomputer. Register 102 contains 4 bits (at the extreme left) which can be written to and read from the bus 106. The four bits at the top right can be written only from the bus; the four bits at the bottom right can only be read to the bus 106. The bits in the part enclosed by a heavy line, moreover, can only be written in response to additional signals yet to be described. The register 102 can receive a write control signal WRS1 and a read control signal RDS1 which are formed elsewhere in the computer. The register 104 is filled under the control of a write control signal WRS2 which is also formed elsewhere in the microcomputer. Element 108 is a programmable counter which is capable of dividing the frequency on the input 100 by 5, 6, 7 or 8. The selection between these four possibilities is performed by two bits from the register 104. Element 110 is an 8-bit counter which receives the output signal of the counter 108. Element 112 is a multiplexer which receives the bits from counter 110. The selection from these eight bits is controlled by three bits from the register 104. The clock signal appears on line 114 and is applied to a clock control element 116. The clock control element conducts the clock signal from line 114 to line 188 if a logic function has been performed, i.e. if the relevant station acts as the master station and if, moreover, the enable bit for serial data transport (see hereinafter) has the value "1". If the logic function has not been performed, the clock control element 116 continuously generates a logic "1" for clock wire 118. The clock wire 118 is connected to clock filter 120. This filter receives the signal from the terminal 100 as the write control signal. The interference on the clock signal received is thus suppressed. The interference-suppressed clock signal is applied, via line 122, to the clock control element 116 again in order to implement the synchronization in accordance with FIG. 5. To this end, a further logic function is formed: if the incoming clock signal is high and if the relevant station acts as the master station, an enable signal appears on line 124; the cascade-connected counters 108 and 110 may only continue counting in order to produce the signal 88 (FIG. 5) on the clock wire if this condition is satisfied. If this condition is not satisfied, these counters will stop at instant a high signal is produced on the clock output. If a signal transition from high to low is produced on the clock wire, a reset signal for the counters 108 and 110 will appear on line 125, so that a low signal will be directly generated on the clock wire (via line 114) and the counters will count the signals on the line 100. The duration of the low signal on the clock wire is thus determined by the slowest station and the duration of the high signal is determined by the fastest station. The processing of the signal on the line 123 will be described hereinafter. The three further control bits in the register 104 remain available for other functions.

The filter 120 is composed of two cascade connected data flipflops which are both loaded with the internal clock signal which is received on the terminal 118. The output signal of filter 120 is a delayed clock which is applied to a logic gate in clock control element 116. The latter gate will only conduct if the relevant station either acts as a master station or has to participate in the address comparison or if it is selected. In that case the "shifted clock signal" is derived from the "delayed clock". If none of the three conditions is satisfied, the last-mentioned gate will continuously output a logic "1". Output leads of clock control element 116 are labelled 123, 124, 125, respectively. The "delayed clock" and "shifted clock" therefore, are synchronized by the clock signal received on the clock wire and are used for synchronizing the supply of the data signals to the data wire and the further processing of the data. If the bits at the various positions in the register 102 have the value "1", they have followed respective indication and control functions: MST: the relevant station is or desires to function as the master station of the bus line. A "0" indicates the slave function. Prior to the realization of a communication operation, this bit can be set by the central control system of the microcomputer. The ultimate operation as the master station is codetermined by the content of the bit positions AL, AAS and AD0. The information of this bit position is applied notably to the clock control element 116 in order to form the previously described logic functions.

TRX: the relevant station is or wishes to act as a transmitter. A "0" indicates the receiver function. This concerns the "actual" communication operation, i.e. not the arbitration where each participating station acts as "master transmitter".

BB: the bus line is busy ("0" means "free").

PJN: This indicates that the station must serve the bus either by reading a serially received data byte, by serially transmitting the next data byte, or by generating a stop condition signal.

ESO: this is an enable bit for the serial in/out communication operations. It is used exclusively for the initialization of the station and is set to the "1" state.

BC2, BC1, BC0: the three bits form a counter state which is filled from the bus 106 and further with the positive going edges of the "shifted clock pulses" described with reference to the clock control element 116. The data bits received are thus counted in order to activate a comparison element 156 at the correct instant; that is to say, when all address bits to be compared have arrived in the correct position, this counter supplies the signal "C7". In the case of a communication operation, this signal indicates that a complete data byte has been transported. In that case a parallel operation as regards the register 126 must take place. The resetting of this counter is realized under the control of the start condition described with the reference to FIGS. 3 and 4. The decoder for the count "C7" is not shown.

AL: the station has lost the test phase of the arbitration for the master station (see FIG. 6, at indication 214) and cannot perform the intended communication operation.

AAS: the station is addressed by another master station as a slave station.

AD0: the station is addressed as a slave in a general mode (general broadcast).

LRB: this bit represents either the last received bit of a data byte, or the acknowledge bit. Note that the acknowledged bits is the ninth bit. Because the data bytes are eight bits wide, the shift register will not accommodate a ninth bit. If only an eight-bit transport is executed, this bit is identical to the least significant bit in element 126. Then only for the first byte transmitted this bit indicates the transport direction.

FIG. 7 also shows a number of adaptation elements for the data wire. First of all, there is provided a shift register 126 which is coupled end-around in a loop in series with the data control element 134 and which is parallel and bidirectionally connected to the internal bus line 106. The shifted clock pulses supplied by the clock control element 116 act as shift pulses. Register 126 is filled in parallel under the control of a signal WRS0; parallel reading of the register is controlled by a signal RDS0. The signals are supplied by the central control system of the microcomputer. The data control element 134 also receives the signal ESO from the register 102. This signal controls an output line amplifier in the data control element 134 which is connected to the data wire. If ESO is zero, the station continuously generates a "1" signal for the data wire. The data filter 136 corresponds to the clock filter 120 as regards construction and operation. The data control element 134 also comprises a switching device having two states. In one state, the signals on line 130 are applied to line 138 via a coupling element and the station will act as a data transmitter. To this end the signal MST must have the value "1" and, moreover, the stop condition STP may not have been detected. The data originating from the element 136 is continuously supplied to the shift register 126 via line 132. The bit TRX controls the direction of the actual data transport. If a master-transmitter station loses an arbitration operation, bit TRX is reset to zero.

The element 142 acts as a detector for the "busy" condition of the bus wire. To this end, it receives the output signals from elements 134 and 116, thus detecting the signal sequences previously described with reference to blocks 60 and 62, respectively (FIG. 3). Detectors 142 may comprise two data flipflops which store the clock signal under the control of a negative-going data edge and a positive-going data edge, respectively (thereby detecting the starting condition and the stop condition, respectively, provided that the clock signal is high). The output pulses of these two data flipflops act as a set/reset signal for the bit BB. A "1" output from one of said flipflops resets the other. If the bit BB has the value 1, the microcomputer will cause a waiting period to expire before any attempt may be made to become the master station. However, operation continues unimpeded if the station had already manifested itself as the master station, (unless the arbitration is lost subsequently).

Element 144 is the logic for arbitration. The logic system comprises a logic gate which supplies the value "1" if the signal on line 130 is "1", the signal on line 132 is "0", a start condition is detected in element 142, and the bit MST has the value "1". This is synchronized by the clock signal on the line 122. If the logic gate 144 supplies a "1", it controls the resetting of the bits MST and TRX (if necessary) and sets the bit AL to "1". The delay until the line 214 in FIG. 6 occurs due to the synchronization wilth the clock.

The circuit also comprises an address register 128. This register is loaded with an address from the bus line 106 under the control of a "1" signal from AND-gate 140. Loading takes place only during initialization under the control of the signal WRS0 (which also acts as the load control signal for the register 126) and the signal ESON, which is the inverse value of bit ESO from register 102. After the initialization, ESO has the value "1". The register 128 serves to store the address of the station. The least significant bit ALS acts to stop the address comparison in the comparator 156. Thus, an interrupt signal is generated after each byte received or transmitted. ALS indicates "always selected".

Element 156 is a 7-bit address comparator for the address number in the register 128 and the address received in the register 126 from data line 138. This comparison is only activated once per communication operation, for the first byte received and synchronized by the counting signal "C7" from the 3-bit counter BC2, BC1, BC0. If correspondence exists, the element 150 (bit AAS) is set to "1". If the "general mode" is applicable, element 152 (bit AD0) is also set to "1". This is realized under the control of a specific address which acts in common for all stations, for example, the address "1111111".

Element 146 comprises interrupt control logic circuitry. If the bit ESO has the value "1" and if the bit ALS is "0", this element supplies an interrupt request signal under the control of a correspondence signal from the comparator.

A communication operation is performed as follows: a station which wishes to initiate the communication operation first sets the bits MST, TRX and BB to "1". Under the control thereof, the data control element 130 directly generates the start condition of the data wire. All stations detecting this start code set the bit BB to "1", so that they can no longer become a master. The master station then generates an 8-bit data byte according to the procedure of FIG. 4. This byte is applied to the data wire 138 via the bus 106 and the register 126. The ninth bit is controlled by one of the three bits not yet specified in the register 104 which can also be filled via the data bus 106. After the second start code, the arbitration procedure in accordance with FIG. 6 commences. After completion of the arbitration, the relevant winning station will be the master transmitter and all other stations will be in the position of slave. As has already been stated, the start code sets a flipflop in the station. When this flipflop has been set and the MST=0, the address comparison is enabled: the "shifted clock" is formed again so that the bit counter (BC0–BC2) correctly continues counting. The signal C7 activates the address comparison. The addressed station then sets the bit AAS and is selected. Subsequently, the communication between the master station and the slave stations may take place; the bit TRX indicates the transport direction of the next data byte. Finally, the master station forms the stop code in that the signal according to FIG. 3 is generated in its data control element. As a result, the bits PIN and BB are reset as well as bits AAS and AD0 in the slave stations. A new master can then manifest itself.

What is claimed is:

1. A system for data transmission comprising:
   (A) at least one master transmitting station which is capable of controlling data transmission, comprising:
      (a) a clock terminal;
      (b) a data terminal;
      (c) means for producing a clock signal at the clock terminal by allowing the clock terminal to assume a second voltage level for each of a series of periodic clock pulse intervals and by forcing the clock terminal to a first voltage level at all other times during production of the clock signal;
      (d) means for producing a start signal which indicates that the master station is prepared to control data transmission by allowing the voltage level at the data terminal to assume a second voltage level for a first fraction of a clock pulse interval and by then forcing the voltage at the data terminal to a first voltage level during the same clock pulse interval;
      (e) means for producing a stop signal which indicates that the master station has finished controlling data transmission by forcing the voltage level at the data terminal to the first voltage level during a first fraction of a clock pulse interval and then allowing the voltage at the data terminal to transition to the second voltage level during the same clock pulse interval;
      (f) means for transmitting binary data by forcing the voltage at the data terminal to the first voltage level during an entire clock pulse interval to transmit a first data value and by allowing the voltage at the data terminal to assume the second voltage level during an entire clock pulse interval to transmit a second data value; and
      (g) at least all but one of the master transmitting stations further comprising means for establishing priority when a plurality of master stations simultaneously attempt to control data transmission which detect the voltage level at the data terminal and which cause the master station which contains said means for establishing priority to cease attempted control of data transmission by allowing the data terminal and the clock terminal to assume the second voltage level for at least a predetermined interval after detection of the first voltage level during a clock interval in which that master station has allowed the data terminal to assume the second voltage level;
   (B) at least one receiving station comprising a data terminal and a clock terminal;
   (C) a data bus which interconnects the data terminals of all the stations;
   (D) a clock bus which interconnects the clock terminals of all the stations; and
   (E) means which maintain the buses at the second voltage level in the absence of forcing by the stations.

2. The system of claim 1 comprising at least two of said master transmitting stations.

3. The system of claims 1 or 2 wherein the means for producing a clock signal comprises:
   a time slot generator which produces a periodic clock signal at the clock terminal by first forcing the clock terminal to the first voltage level for a first interval of predetermined duration, by then allowing the clock terminal to assume the second voltage level for a second interval of predetermined duration, and by then again forcing the clock terminal to the first voltage level; and
   means which detect the voltage level at the clock terminal and which cause the time slot generator to start the first interval whenever the voltage level at the clock terminal changes from the second voltage level to the first voltage level;
   whereby a synchronous clock signal will be produced on the clock bus by simultaneously operating master transmitting stations.

4. A data transmission station comprising:
   (a) a clock terminal;
   (b) a data terminal;
   (c) means for producing a clock signal at the clock terminal by allowing the clock terminal to assume a second voltage level for each of a series of periodic clock pulse intervals and by forcing the clock terminal to a first voltage level at all other times during production of the clock signal;
   (d) means for producing a start signal which indicates that the station is prepared to transmit data by allowing the voltage level at the data terminal to assume a second voltage level for a first fraction of a clock pulse interval and by then forcing the voltage at the data terminal to a first voltage level during the same clock pulse interval;
   (e) means for producing a stop signal which indicates that the station has finished transmitting data by forcing the voltage level at the data terminal to the first voltage level during a first fraction of a clock pulse interval and then allowing the voltage at the data terminal to transition to the second voltage level during the same clock pulse interval; and
   (f) means for transmitting binary data by forcing the voltage at the data terminal to the first voltage level during an entire clock pulse interval to transmit a first data value and by allowing the voltage at the data terminal to assume the second voltage level during an entire clock pulse interval to transmit a second data value.

5. The data transmission station of claim 4 wherein by means for producing a clock signal comprises:
   a time slot generator which produces a periodic clock signal at the clock terminal by first forcing the clock terminal to a first voltage level for a first interval of predetermined duration, by then allowing the clock terminal to assume a second voltage level for a second interval of predetermined duration, and by then again forcing the clock terminal to the first voltage level, and
   means which detect the voltage level at the clock terminal and which cause the time slot generator to start the first interval whenever the voltage level at the clock terminal changes from the second voltage level to the first voltage level.

6. A data transmission system comprising:
   at least two of the data transmission stations of claim 5;

a clock bus which interconnects the clock terminals of the stations; and means which maintains the clock bus at the second voltage level in the absence of forcing by the data transmission stations.

7. In a station for data transmission, the improvement comprising:

a clock terminal;

a time slot generator which produces a periodic clock signal at the clock terminal by first forcing the clock terminal to a first voltage level for a first interval of predetermined duration, by then allowing the clock terminal to assume a second voltage level for a second interval of predetermined duration, and by then again forcing the clock terminal to the first voltage level, and means which detect the voltage level at the clock terminal and which cause the time slot generator to start the first interval whenever the voltage level at the clock terminal changes from the second voltage to the first voltage level.

8. A data transmission system comprising:

at least two of the data transmission stations of claim 7;

a clock bus interconnecting the clock terminals of the stations; and means which maintain the clock bus at the second voltage level in the absence of forcing by the stations.

9. A system for data transmission comprising:

(A) at least two master transmitting stations which are capable of controlling data transmission, each comprising:
 (a) a clock terminal;
 (b) a data terminal;
 (c) a time slot generator which produces a periodic clock signal at the clock terminal by first forcing the clock terminal to a first voltage level for a first interval of predetermined duration, by then allowing the clock terminal to assume a second voltage level for a clock pulse interval of predetermined duration, and by then again forcing the clock terminal to the first voltage level;
 (d) means which detect the voltage level at the clock terminal and which cause the time slot generator to start the first interval whenever the voltage level at the clock terminal changes from the second voltage level to the first voltage level;
 (e) means for producing a start signal which indicates that the master station is prepared to control data transmission allowing the voltage level at the data terminal to assume a second voltage level for a first fraction of a clock pulse interval and by then forcing the voltage at the data terminal to a first voltage level during the same clock pulse interval;
 (f) means for producing a stop signal which indicates that the master station is finished controlling data transmission by forcing the voltage level at the data terminal to the first voltage level during a first fraction of the clock pulse interval and by then allowing the voltage at the data terminal to transition to the second voltage level during the same clock pulse interval;
 (g) means for transmitting binary data by forcing the voltage at the data terminal to the first voltage level during an entire clock pulse interval to transmit a first data value and by allowing the voltage at the data terminal to assume the second voltage level during an entire clock pulse interval to transmit a second data value;

(B) at least one receiving station comprising a data terminal and a clock terminal;

(C) a data bus which interconnects the data terminals of all of the stations;

(D) a clock bus which interconnects the clock terminals of all of the stations; and (E) means which maintain the buses at the second voltage level in the absence of forcing by the stations.

10. A system for data transmission comprising:

(A) at least two master transmitting stations which are capable of controlling data transmission, comprising each:
 (a) a clock terminal;
 (b) a data terminal;
 (c) means for producing a clock signal at the clock terminal by allowing the clock terminal to assume a second voltage level for each of a series of periodic clock pulse intervals and by forcing the clock terminal to a first voltage level at all other times during production of the clock signal;
 (d) means for producing a start signal which indicates that the master station is prepared to control data transmission by allowing the voltage level at the data terminal to assume a second voltage level for a first fraction of a clock pulse interval and by then forcing the voltage at the data terminal to a first voltage level during the same clock pulse interval;
 (e) means for producing a stop signal which indicates that the master station has finished controlling data transmission by forcing the voltage level at the data terminal to the first voltage level during a first fraction of a clock pulse interval and then allowing the voltage at the data terminal to transition to the second voltage level during the same clock pulse interval; and
 (f) means for transmitting binary data by forcing the voltage at the data terminal to the first voltage level during an entire clock pulse interval to transmit a first data value and by allowing the voltage at the data terminal to assume the second voltage level during an entire clock pulse interval to transmit a second data value;

(B) at least one receiving station comprising a data terminal and a clock terminal;

(C) a data bus which interconnects the data terminals of all of the stations;

(D) a clock bus which interconnects the clock terminals of all the stations; and (E) means which maintain the buses at the second voltage level in the absence of forcing by the stations.

11. In a system for data transmission, the improvement comprising:

(A) a master transmitting station which is capable of controlling data transmission, comprising:
 (a) a clock terminal;
 (b) a time slot generator which produces a periodic clock signal at the clock terminal by first forcing the clock terminal to a first voltage level for a first interval of predetermined duration, by then allowing the clock terminal to assume a second voltage level for a second interval of predetermined duration, and by then again forcing the clock terminal to the first voltage level; and (c) means which detect the voltage level at the clock terminal and which cause the time slot generator to start the first interval whenever the voltage level at the clock terminal changes from the second voltage level to the first voltage level;

(B) at least one receiving station comprising a clock terminal;

(C) a clock bus which interconnects the clock terminals of all of the stations; and (D) means which maintain the clock bus at the second voltage level in the absence of forcing by the stations.

12. The system of claim 11 comprising at least two of said master transmitting stations.

13. A data tansmission station comprising:
(a) a clock terminal;
(b) a data terminal;
(c) means for producing a clock signal at the clock terminal by allowing the clock terminal to assume a second voltage level for each of a series of periodic clock pulse intervals and by forcing the clock terminal to a first voltage level at all other times during production of the clock signal;
(d) means for producing a start signal which indicates that the station is prepared to transmit data by allowing the voltage level at the data terminal to assume a second voltage level for a first fraction of a clock pulse interval and by then forcing the voltage at the data terminal to a first voltage level during the same clock pulse interval;
(e) means for producing a stop signal which indicates that the station is finished transmitting data by forcing the voltage level at the data terminal to the first voltage level during a first fraction of a clock pulse interval and by then allowing the voltage at the data terminal to transition to the second voltage level during the same clock pulse interval;
(f) means for transmitting binary data by forcing the voltage at the data terminal to the first voltage level during an entire clock pulse interval to transmit a first data value and by allowing the voltage at the data terminal to assume the second voltage level during an entire clock pulse interval to transmit a second data value; and
(g) means for establishing priority if a plurality of interconnected stations simultaneously attempt to control data transmission which detect the voltage level at the data terminal and which cause the station to allow both the clock terminal and the data terminal to assume the second voltage level for at least a predetermined interval after detection of the first voltage level on the data terminal during a clock interval in which the station has allowed the data terminal to assume the second voltage level.

14. The station of claim 13 wherein the means for producing the clock signal comprises:
a time slot generator which produces a periodic clock signal at the clock terminal by first forcing the clock terminal to a first voltage level for a first interval of predetermined duration, by then allowing the clock terminal to assume a second voltage level for a second interval of predetermined duration, and by then again forcing the clock terminal to the first voltage level, and
means which detect the voltage level at the clock terminal and which cause the time slot generator to start the first interval whenever the voltage level at the clock terminal changes from the second voltage level to the first voltage level.

15. A data transmission system comprising either at least two of the stations of claim 13 or at least two of the stations of claim 14;
a clock bus which interconnects the clock terminals of the stations; and
a data bus which interconnects the data terminals of the stations.

16. A method of data transmission on a data transmission system which comprises a plurality of stations, each station having a data terminal and a clock terminal, the data terminals of all stations being interconnected by a data bus and the clock terminals of all stations being interconnected by a clock bus, comprising:
transmitting a clock signal from a first master station along the clock bus by allowing the clock terminal of the first master station to assume a second voltage level during each of a series of periodic clock pulse intervals and by forcing the clock terminal of the first master station to a first voltage level at all other times during transmission of the clock signal;
transmitting a start signal, which indicates that the first master station is prepared to control data transmission, by allowing the data terminal of the first master station to assume a second voltage level during a first fraction of a clock pulse interval and then forcing the voltage level at the data terminal of the first master station to a first voltage level during said clock pulse interval;
transmitting a stop signal which indicates that the first master station has finished controlling data transmission by forcing the voltage level at the data terminal of the first master station to the first voltage level during a first fraction of the clock pulse interval and by then allowing the voltage level at the data terminal of the first master station to transition to the second voltage level during the same clock pulse interval; and
transmitting binary data by forcing the voltage level of a data terminal of a station to the first voltage level during an entire clock pulse interval to transmit a first data value and by allowing the voltage level at the data terminal of said station to assume the second voltage level during an entire clock pulse interval to transmit a second data value.

17. The method of claim 16 wherein the step of transmitting the clock signal comprises:
forcing the clock terminal of the first master station to a first voltage level for a first interval of predetermined duration, then allowing the clock terminal of the first master station to assume a second voltage level for a second interval of predetermined duration, and then again forcing the clock terminal to the first voltage level, and
detecting the voltage level at the clock terminal of the first master station and starting said first interval whenever the voltage level at the clock terminal changes from the second voltage level to the first voltage level,
and further comprising the step of creating a wired logic function on the clock bus by pulling the clock bus to the second voltage level in the absence of forcing by any of the stations.

18. The method of claim 16 or 17 wherein the system includes at least two master transmitting stations each of which is capable of transmitting a clock signal and further comrpising the step of:

preventing interference between simultaneously transmitting master stations by inhibiting the master stations from initiating transmission of a clock signal at such times that said master stations detect that a clock signal is already present on the clock bus.

19. A method of operating a data transmission system which includes a plurality of master transmitting stations each having a clock terminal, the clock terminals of all stations being interconnected by a bus, comprising the steps of:

creating a wired logic function on the bus by pulling the bus toward a second voltage level in the absence of forcing by any of the stations; and synchronizing transmission of clock signals by simultaneously transmitting master stations by causing each master station to first force the clock terminal to a first voltage level for a first voltage interval having a duration which is locally predetermined for each master station, by then allowing the clock terminal of each master station to assume a second voltage level for a second interval having a duration which is locally predetermined for each master station, and by then causing each master station to again force the clock terminal to the first voltage level and by causing each master station to start said first interval whenever the voltage level on the clock bus changes from the second voltage level to the first voltage level.

20. The method of claim 19 further comprising the step of arbitrating priority if a plurality of interconnected master stations simultaneously attempt to control data transmission by pulling a data bus to a second voltage level in the absence of forcing by any master transmitting station, determining the voltage level on the data bus during data transmission, identifying master stations which have allowed the data bus to assume the second voltage level at times when the data bus is, in fact, at the first voltage level, and causing the identified master stations to cease data transmission for a period of time following such identification.

21. A communication system comprising:

a first plurality of transmitting and receiving stations including at least one master station and at least one slave station;

a data bus for transporting a series of data bits between at least one transmitting station and at least one receiving station;

a clock bus for transporting a synchronizing clock signal in synchronism with each data bit;

each bus further comprising logic means for forming a wired logic function between levels which denote a first and a second logic value respectively which are transmitted by the stations so that the level of the bus can be pulled to the first logic value by any station presenting a signal having the first logic value to the bus thereby masking any signal having the second logic value that may be presented to the bus;

each transmitting station comprising data transmitting means which, in each bit cell of a selected bit cell sequence, present a respective data bit on the data bus for a period of time which covers the duration of the associated clock pulse, including the edges thereof;

wherein each master station comprises:

(a) clock transmitting means which generate a series of clock pulses, each having the second logic value, on the clock bus to define a series of bits cells;

(b) means which form a first stop signal by forming a signal transition on the data bus from said first logic value to said second logic value, during the presence of a signal of the second logic value on the clock bus;

(c) means which form a first start signal by forming a signal transition on the data bus from said second logic value to said first logic value during the presence of a signal of the second logic value on the clock bus;

all non-master stations connected to the system comprising means for continuously presenting said second logic value to the clock bus and any non-transmitting station connected to the system comprising means for continuously presenting said second logic value to the data bus during said selected bit cell sequences.

22. The system of claim 1, 9, 10, 11 or 21 wherein each bus is a single wire.

23. A communication system as claimed in claim 21 wherein there may be a plurality of simultaneously transmitting master stations connected to the busses, wherein each of said master stations further comprise:

a time slot generator having an input for receiving a second start signal from the clock bus;

a detector for detecting a signal transition on the clock bus as a representation of said second start signal, which signal is produced by the combination of the first station which supplies a clock signal transition from said second to said first logic value and the last station which supplies a signal transition from said first to said second logic value, and for supplying an end signal after termination of a time slot which is started thereby;

said clock transmitting means in said master stations further forming a modified signal for the clock bus under the control of said end signal.

24. A communication system as claimed in claim 23 wherein said master stations further comprise detection means for detecting, during a clock pulse, a discrepancy between a logic value which is present on the data bus and logic value which is presented to the data bus by its own data transmitting means and means for controlling a switch-over of said master station to a non-master condition upon the detection of such discrepancy.

25. A communication system as claimed in claim 21 wherein, in at least one master station, said data transmitting means and said means which form a first start signal further function to start a data transport operation by successively forming: the first start signal, a first series of at least two data bits having the first logic value, a second series of at least one data bit having the second logic value, and a second start signal which corresponds to the first start signal.

26. A communication system as claimed in claim 25 wherein all stations connected to the system comprise interrogation means having a dead time which is shorter than the length of the first series of data bits.

27. A communication system as claimed in claim 26 further comprising a slave station having data transfer means for communicating data bits with the data bus in bit cells which are at least two times shorter than the dead time.

28. A communication system as claimed in claim 25 further comprising a slave station which includes means for resetting the slave station and for receiving an address on said data bus after reception of said second start signal.

29. Apparatus which operates as a master transmitter for data transmission comprising:
- a data terminal for communicating a series of data bits;
- a clock terminal for communicating a synchronizing clock signal, which defines a bit cell in synchronism with each data bit;
- wherein the terminals have a low output impedance for a first logic value locally presented on said terminals and the terminals have a substantially higher output impedance for a second logic value locally presented on said terminals;
- clock transmitting means which generate a clock pulse at the clock terminal which has the second logic value in each bit cell;
- data transmitting means which generate a respective data bit on the data terminal for a period of time which covers the duration of the associated clock pulse, including the edges thereof, in each bit cell of selected bit cell sequences;
- means which form a stop signal by forming a signal transition at the data terminal from said first to said second logic value during the generation of a signal of the second logic value at the clock terminal; and
- means which form a first start signal by forming a signal transition at the data terminal from said second logic value to said first logic value during generation of a signal of the second logic value on the clock terminal.

30. Apparatus as claimed in claim 29, comprising a time slot generator having:
- an input for receiving a second start signal from the clock terminal;
- detector means which detect a signal transition at the clock terminal as an exclusive representation of said second start signal, which signal is produced by the combination of a clock signal transition from said second to said first logic value and by a clock signal transition from said first to said second logic value; and
- means which supply an "end" signal after termination of a time slot which is started thereby;
- and wherein said clock transmitting means further forms a modified clock signal under control of said "end" signal.

31. Apparatus as claimed in claim 30, further comprising means which detect a discrepancy between a logic value which is present at the data terminal and a data bit which is presently generated by the data transmitting means during a clock pulse and means for controlling a switch-over of the master station to a non-master station condition upon detection of such discrepancy.

32. Apparatus which operates as a master receiver for data transmission comprising:
- a data terminal for communicating a series of data bits;
- a clock terminal for communicating a synchronizing clock signal, which defines a bit cell in synchronism with each data bit;
- wherein the terminals have a low output impedance for a first logic value locally presented on said terminals and the terminals have a substantially higher output impedance for the second logic value locally presented on said terminals;
- clock transmitting means which generate a clock pulse having the second logic value in each bit cell at the clock terminal;
- means for continuously generating a signal having said second logic value which is overridable by a lower impedance signal of said first logic value in each bit cell of selected bit cell sequences at the data terminal;
- means which form a stop signal by forming a signal transition at the data terminal from said first to said second logic value during the generation of a signal of the second logic value on the clock terminal;
- means which form a start signal by forming a signal transition at the data terminal from said second logic value to said first logic value during presentation of a signal of the second logic value on the clock terminal.

33. Apparatus which operates as a slave transmitter for data transmission comprising:
- a data terminal for communicating a series of data bits;
- a clock terminal for communicating for a synchronizing clock signal which defines a bit cell in synchronism with each data bit;
- wherein the data terminal has a low output impedance for a first logic value locally presented on said data terminal and the data terminal has a substantially higher output impedance for a second logic value locally presented on said data terminal; and
- data transmitting means which generate a respective data bit at the data terminal for a period of time which covers the duration of a second logic value clock pulse signal, including the edges thereof, which is received at the clock terminal in each bit cell of selected bit cell sequences.

34. Apparatus which operates as a slave receiver for data transmission comprising:
- a data terminal for receiving a series of data bits;
- a clock terminal for receiving a synchronizing clock signal which defines a bit cell in synchronism therewith for each data bit;
- means which continuously generate a second logic value at the clock terminal which is overridable by a lower impedance signal of a first logic value, during each bit cell of selected bit cell sequences;
- means which continuously generate said second logic value at the data terminal which is overridable by a lower impedance signal of said first logic value, in each bit cell of said bit cell sequences;
- means which send an acknowledge bit which directly follows said bit cell sequence; and
- means which selectively control a transition of said apparatus to a non-receiver condition in response to an eighth bit of an eight bit data sequence which is received at the data terminal.

35. An apparatus as claimed in claim 34, comprising 7-bit address comparator means which respond to earlier bits of a received data sequence.

* * * * *

UNITED STATES PATENT AND TRADEMARK OFFICE
CERTIFICATE OF CORRECTION

PATENT NO. : 4,689,740

DATED : August 25, 1987

INVENTOR(S) : ADRIANUS P.M.M. MOELANDS ET AL

It is certified that error appears in the above-identified patent and that said Letters Patent is hereby corrected as shown below:

Title page, insert --Related U.S. Application Data
                     [63] Continuation-in-part of
                     Ser. No. 310,686, Oct. 13,1981--.

Column 1, line 5, insert --This Application is a Continuation-in-part of Ser. No. 310,686, filed Oct. 13, 1981--.

Signed and Sealed this

Twenty-third Day of February, 1988

Attest:

DONALD J. QUIGG

*Attesting Officer*            *Commissioner of Patents and Trademarks*

UNITED STATES PATENT AND TRADEMARK OFFICE
CERTIFICATE OF CORRECTION

PATENT NO. : 4,689,740

DATED : August 25, 1987

INVENTOR(S) : Adrianus P.M.M. Moelands et al

It is certified that error appears in the above-identified patent and that said Letters Patent is hereby corrected as shown below:

TITLE PAGE

Insert --[30] Foreign Application Priority Data

Oct. 31, 1980 [NL] Netherlands

......8005976--

Signed and Sealed this

Eighth Day of November, 1988

*Attest:*

DONALD J. QUIGG

*Attesting Officer*     *Commissioner of Patents and Trademarks*